United States Patent
Freitag et al.

(10) Patent No.: US 10,067,711 B2
(45) Date of Patent: *Sep. 4, 2018

(54) DATA TRANSFER BETWEEN DATA STORAGE LIBRARIES

(71) Applicant: International Business Machines Corporation, Armonk, NY (US)

(72) Inventors: Bernd Freitag, Partenheim (DE); Brian G. Goodman, Tucson, AZ (US); Frank Krick, Ockenheim (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,385

(22) Filed: Nov. 1, 2015

(65) Prior Publication Data

US 2017/0123672 A1    May 4, 2017

(51) Int. Cl.
*G06F 3/06* (2006.01)

(52) U.S. Cl.
CPC ............ *G06F 3/065* (2013.01); *G06F 3/0604* (2013.01); *G06F 3/067* (2013.01); *G06F 3/0634* (2013.01); *G06F 3/0638* (2013.01); *G06F 3/0686* (2013.01)

(58) Field of Classification Search
CPC ...... G06F 3/065; G06F 3/0604; G06F 3/0634; G06F 3/0638; G06F 3/067; G06F 3/0686
See application file for complete search history.

(56) References Cited

U.S. PATENT DOCUMENTS

| | | | | |
|---|---|---|---|---|
| 4,521,850 A | * | 6/1985 | Wilhite ................. | G06F 9/3804 712/200 |
| 5,740,061 A | * | 4/1998 | Dewey ............... | G11B 15/6835 414/273 |
| 6,401,127 B1 | * | 6/2002 | Lei ........................ | H04L 1/0018 709/232 |

(Continued)

FOREIGN PATENT DOCUMENTS

| WO | 2010111312 A2 | 9/2010 |
|---|---|---|
| WO | 2011093796 A1 | 8/2011 |

OTHER PUBLICATIONS

IBM: List of IBM Patents or Patent Applications Treated As Related (Appendix P).

(Continued)

*Primary Examiner* — David Yi
*Assistant Examiner* — Craig S Goldschmidt
(74) *Attorney, Agent, or Firm* — Kristofer L. Haggerty (57) ABSTRACT

Transferring data from a first data storage cartridge of a first data storage library to a second data storage library. The first library includes a first data storage drive, the second library includes a second data storage drive. A mounting of the first data storage cartridge into the first data storage drive is initiated. A network connection between the first and second data storage drives, with both data storage drives operating in a data transfer mode, is initiated. A mounting of a second data storage cartridge into the second data storage drive is initiated. A copying of the data content of the first data storage cartridge onto the second data storage cartridge via the network connection is initiated. A deletion of the data of the first data storage cartridge is initiated.

16 Claims, 6 Drawing Sheets

(56) References Cited

U.S. PATENT DOCUMENTS

| | | | |
|---|---|---|---|
| 6,523,102 B1* | 2/2003 | Dye | G06F 12/023 |
| | | | 709/247 |
| 7,752,384 B2 | 7/2010 | Moody, II et al. | |
| 8,223,600 B2 | 7/2012 | Barbian et al. | |
| 8,427,774 B2 | 4/2013 | Green et al. | |
| 8,527,561 B1 | 9/2013 | Moody, II et al. | |
| 8,566,517 B1 | 10/2013 | Sims et al. | |
| 8,675,296 B2 | 3/2014 | Amir et al. | |
| 8,868,866 B2 | 10/2014 | Hoelsaeter | |
| 8,886,606 B2 | 11/2014 | Wideman | |
| 2003/0028841 A1* | 2/2003 | Rushton | G11B 5/00813 |
| | | | 714/781 |
| 2006/0212481 A1* | 9/2006 | Stacey | G06F 17/30067 |
| 2007/0006020 A1 | 1/2007 | Fujita | |
| 2007/0283120 A1* | 12/2007 | Fujita | G06F 3/0613 |
| | | | 711/170 |
| 2007/0299959 A1 | 12/2007 | Penny et al. | |
| 2008/0282031 A1* | 11/2008 | Tanoue | G06F 3/0611 |
| | | | 711/114 |
| 2009/0177838 A1 | 7/2009 | Haustein et al. | |
| 2009/0213490 A1 | 8/2009 | Green et al. | |
| 2012/0131280 A1* | 5/2012 | Iwasaki | G06F 3/065 |
| | | | 711/133 |
| 2013/0271865 A1 | 10/2013 | Amir et al. | |
| 2014/0379980 A1 | 12/2014 | Hasegawa et al. | |
| 2015/0055241 A1 | 2/2015 | Abe et al. | |
| 2017/0126780 A1 | 5/2017 | Freitag | |
| 2018/0081553 A1 | 3/2018 | Freitag | |

OTHER PUBLICATIONS

Pending U.S. Appl. No. 14/929,384, filed Nov. 1, 2015, Entitled: "Data Transfer Via a Data Storage Drive", 80 pages.

Pease et al., "The Linear Tape File System", 2010 IEEE, 8 pages.

Prakash, "Back to the Future: Using Magnetic Tapes in Cloud Based Storage Infrastructures", Middleware 2013, LNCS 8275, pp. 287-306.

Sun Microsystems, "StorageTek Streamline SL8500", Modular Library System, User's Guide Part No. 96154, Revision K, Mar. 2007, 200 pages.

International Search and Examination Report, Date of Search Mar. 22, 2017, Application No. GB1616436.0, 8 pages.

IBM, List of IBM Patents or Patent Applications Treated as Related, Appendix P, dated Apr. 4, 2018, 2 pages.

* cited by examiner

DATA TRANSFER BETWEEN DATA STORAGE LIBRARIES

BACKGROUND

The present invention relates generally to the field of transferring data between computer peripherals, and more particularly to transferring the data content of a first data storage cartridge of a first data storage library to a second data storage library.

With the ever-growing storage capacities of modern data storage systems, data analysis applications are required to analyze large data repositories provided by these systems. In order to further enlarge the storage capacity, modern data storage systems rely on distributed infrastructures such as cloud infrastructures. These systems include large numbers of storage units such as storage libraries, each library including large numbers of storage media. For example, the storage capacity provided by magnetic tape libraries may range from terabytes up to exabytes of data. A respective magnetic tape library may include thousands of magnetic tapes packaged in cartridges. In order to be able to perform data analysis tasks for these distributed systems, data analysis applications may require access for a short period of time to data stored on storage locations distributed over multiple libraries.

For this type of data analysis, there is a need for high-performance access to data stored on magnetic tapes in multiple magnetic tape libraries. In addition, host applications that commonly use magnetic tape libraries expect to be able to move any magnetic tape cartridge to any magnetic tape drive in the library. As libraries increase in size, to handle the very large data demands of cloud computing, among other things, they may become difficult to manage. For example, the space available in a data center for installing a new library or expanding an existing library may be limited due to other equipment installed nearby, or the presence of walls, columns, air conditioning systems, etc. This has created the need for installing multiple independent library systems and mechanically connecting them such that cartridges can pass from one library to another, thereby creating a very large library from multiple smaller libraries.

For transferring data between magnetic tape libraries, mechanical pass-through connections are known from the prior art. These mechanical pass-through connections are provided, for example, by automated electromechanical transportation tunnel systems extending between the magnetic tape libraries, and mechanically transporting magnetic tape cartridges from one magnetic tape library to another.

However, known mechanical transport systems may have the following disadvantages: mechanical wear of individual components of the transport system; mechanical defects with the risk of a blocking of the transportation tunnel due to cartridges stuck therein; high workload and costs due to the requirement of manually building up the mechanical systems and performing alignment maintenance work; the requirement of providing magnetic tape libraries at the same location, e.g., next to each other within a data center, in order to be able to provide reliable mechanical transport connections; the requirement to use the same and/or compatible magnetic tape library type and magnetic tape technology, e.g., LTO (linear tape-open), in order to ensure usability of exported magnetic tape cartridges by the target libraries; limited flexibility and scalability of the mechanical infrastructure; loss of exported magnetic tape cartridges by the source, i.e., these losses need to be compensated by importing new magnetic tape cartridges in order to maintain the storage capacity of the source library; and limited storage capacity for storing imported magnetic tape cartridges by the target library.

SUMMARY

Embodiments of the present invention disclose a computer-implemented method, computer program product, and system for transferring the data content of a first data storage cartridge of a first data storage library to a second data storage library.

In one aspect, the invention relates to a method for transferring the data content of a first magnetic tape of a first magnetic tape library to a second magnetic tape library. The first library includes a first magnetic tape drive, the second library includes a second magnetic tape drive. The first and second magnetic tape drives are configured to be operable in a first mode, data transfer mode, for transferring magnetic tape data from the first magnetic tape drive to the second magnetic tape drive via a network connection. Data transfer between the first and second magnetic tape drive is controlled by a data transfer management component. A mounting of the first magnetic tape into the first magnetic tape drive is initiated. A network connection between the first and second magnetic tape drive is initiated, with both magnetic tape drives being operated in the data transfer mode. A mounting of a second magnetic tape into the second magnetic tape drive is initiated. A copying of the data content of the first magnetic tape onto the second magnetic tape via the network connection is initiated. A deletion of the data of the first magnetic tape is initiated.

A data storage cartridge as understood herein may, for example, encompass a magnetic tape cartridge comprising a magnetic tape. A data storage drive as understood herein may, for example, encompass a magnetic tape drive. A data storage library as understood herein may, for example, encompass a magnetic tape library.

In a further aspect, the invention relates to a computer program product for transferring the data content of a first magnetic tape of a first magnetic tape library to a second magnetic tape library, the first library comprising a first magnetic tape drive, the second library comprising a second magnetic tape drive, the first and second magnetic tape drives being configured to be operable in a data transfer mode for transferring magnetic tape data from the first magnetic tape drive to the second magnetic tape drive via a network connection, data transfer between the first and second magnetic tape drive being controlled by a data transfer management component, the computer program product comprising a computer readable storage medium having program instructions embodied therewith, the program instructions executable by a processor being adapted to cause the processor to control the data transfer management component to:

initiate a mounting of the first magnetic tape into the first magnetic tape drive, initiate a network connection between the first and second magnetic tape drive, both magnetic tape drives being operated in the data transfer mode, initiate a mounting of a second magnetic tape into the second magnetic tape drive, initiate a copying of the data content of the first magnetic tape onto the second magnetic tape via the network connection, initiate a deletion of the data of the first magnetic tape.

In a further aspect, the invention relates to a data transfer management computer system for transferring the data content of a first magnetic tape of a first magnetic tape library to a second magnetic tape library, the first library comprising a first magnetic tape drive, the second library comprising a second magnetic tape drive, the first and second magnetic tape drives being configured to be operable in a data transfer mode for transferring magnetic tape data from the first magnetic tape drive to the second magnetic tape drive via a network connection, data transfer between the first and second magnetic tape drive being controlled by the data transfer management computer system, the data transfer management computer system computer system comprising a memory for storing machine executable instructions and a processor for executing the machine executable instructions, execution of the machine executable instructions by the processor causing the processor to execute a method comprising:

initiate a mounting of the first magnetic tape into the first magnetic tape drive,     initiate a network connection between the first and second magnetic tape drive, both magnetic tape drives being operated in the data transfer mode,     initiate a mounting of a second magnetic tape into the second magnetic tape drive,     initiate a copying of the data content of the first magnetic tape onto the second magnetic tape via the network connection,     initiate a deletion of the data of the first magnetic tape.

DETAILED DESCRIPTION

The present invention may also include the following example features:

A magnetic tape library as used herein is a storage system which may comprise one or more tape drives performing reading and writing of data from and onto magnetic tapes, a plurality of slots to hold tape cartridges comprising magnetic tapes, and one or more automated robotic mechanisms for loading tapes from storage slots into the magnetic tape drives. A tape library may further comprise a barcode reader to identify tape cartridges and thereby the data stored thereon. Such a magnetic tape library may have the capability of optically scanning barcode labels which are attached to each magnetic tape cartridge, allowing automatically maintaining an inventory of the locations of the magnetic tape cartridges within the library. The tape drives may comprise compression modules, e.g., compression chips, in form of embedded software and/or hardware components providing lossless data compression and decompression of data written on and read from the magnetic tapes. Algorithms used for the data compression may be, for example, LZ, IDRC, ALDC, or DLZ1.

Magnetic tape libraries may provide a finite storage capacity for magnetic tape cartridges due to spatial restrictions. In order to exceed this finite capacity, a plurality of tape libraries may be interconnected, e.g., in the form of a long library string, where the library frames are added side by side and an accessor may travel between the library frames to move magnetic tape cartridges from storage slots to the tape drives. The storage capacity may further be increase by connecting those library strings with mechanical pass-through mechanisms, e.g., an automated electromechanical transportation tunnel systems extending between the magnetic tape libraries.

A magnetic tape may be comprised by a cartridge, sometimes also referred to as a cassette. The cartridge may comprise one or more reels. For simplicity a magnetic tape cartridge may herein also be referred to as magnetic tape.

A magnetic tape library infrastructure comprising a plurality of magnetic tape libraries may, e.g., be used to provide a cloud storage infrastructure. Cloud computing may refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Such a cloud storage infrastructure may, e.g., be used for backup tasks. Cloud computing may, e.g., provide for the following:

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storages, deployed applications, and possibly limited control of select networking components (e.g., host firewalls).

A magnetic tape library infrastructure comprising a plurality of magnetic tape libraries may, e.g., comprise individual direct and/or indirect network connections and may not be part of a storage cloud infrastructure.

A network may be any kind of wireless or wired information network, such as Ethernet or a storage area network (SAN) using, e.g., Fibre Channel (FC). A network connection may be a point-to-point data communication channel over data network between two network devices, such as computer devices or magnetic tape drives. Fibre Channel is a high-speed network technology, commonly running at 2-, 4-, 8- and 16-gigabit per second rates, which is standardized in the T11 Technical Committee of the International Committee for Information Technology Standards (INCITS). Fibre Channel may be provided in three major topologies depending on the number of ports that are connected. A port may refer to any entity that actively communicates over the network. The point-to-point (FC-P2P) topology comprises two devices connected directly to each other. In the arbitrated loop (FC-AL) topology all devices are placed in a loop or ring such that adding or removing a device from the loop causes all activity on the loop to be interrupted. In case of the switched fabric (FC-SW) topology, all devices or loops of devices are connected to Fibre Channel switches.

This may have the beneficial effect that the data content of a magnetic tape is efficiently transferred from one magnetic tape library to another magnetic tape library. The deletion may have the beneficial effect that the content of the library infrastructure is kept consistent, e.g., each data tape is provided only once. Furthermore this may have the beneficial effect that the data content transfer no missing magnetic tapes have to be substituted in order to maintain the storage capacity of the individual magnetic tape libraries.

Advantages of the present invention may be the following:
  Embodiments may provide multipurpose tape drives which can be configured dynamically for inter library data transfer operations or normal magnetic tape read/write operations. This may increase the overall tape library data throughput in both nodes provided by the respective magnetic tape drives.
  Data exchange between different concurrent running applications and tape library systems worldwide may be provided.
  Short data delivery times may be implemented, e.g., due to the fact that only a single cartridge comprising the first magnetic tape may be moved within the first magnetic tape library.
  A dynamical configuration of data transfer channels in form of network connections between magnetic tape drives may allow for a flexible system configuration.
  Load balancing over different magnetic tape libraries and associated servers may be supported.
  A consistent data inventory of the magnetic tape libraries may be maintained.

Embodiments may further have the beneficial effect of providing an automatic transfer of the content of a magnetic tape, for example:
  between magnetic tape libraries of multiple different vendors,
  between different magnetic tape technologies and generations,
  between different locations of different data centers around the globe.

According to various embodiments, the method further comprises: in response to the copying initiating a rewinding of both magnetic tapes in both magnetic tape drives.

According to various embodiments, a copying of the full content of the first magnetic drive is initiated.

This may have the beneficial effect that the full data content of a magnetic tape is efficiently transferred from one magnetic tape library to another magnetic tape library.

According to various embodiments, the data content is provided on the first magnetic tape in a compressed data format, the method further comprises: controlling the first and second magnetic tape drive to maintain the compressed data format, when copying the data content.

In order to save storage space, data stored on magnetic tapes in magnetic tape libraries may be compressed. When the respective data is read from the magnetic tape, it is decompressed by the magnetic tape drive reading the magnetic tape using a compression module embedded in the magnetic tape drive and thus provided in an uncompressed format to the computer system receiving the data. A compression module as used herein refers to a software and/or a hardware component configured for compressing and/or decompressing of data. When writing data onto a magnetic tape, the data is provided in an uncompressed format to the magnetic tape drive and compressed by the compression module before being stored.

The present feature may have the beneficial effect that the data content read from the first magnetic tape by the first magnetic tape drive to be copied to the second magnetic tape drive is not decompressed. The compressed format of the data is rather maintained by bypassing the compression module of the first magnetic tape drive. Thus, the data volume transferred from the first magnetic tape drive to the second magnetic tape drive due to the compression may be significantly smaller than the same data in the uncompressed format, e.g., by a factor of two or three. Compressed data received by the second magnetic tape drive may be decompressed by the second magnetic tape drive using its compression module in case the respective data content is read after the copying.

According to various embodiments, the network connection initiated between the first and second magnetic tape drive is a wireless network connection.

This may have the beneficial effect that the data content of a magnetic tape is efficiently transferred from one magnetic tape library to another magnetic tape library even though one or both of the libraries may be located at remote areas of difficult access. An efficient data tape transfer may further be provided even in case the two libraries are moving relatively to each other, e.g., in case of one of the two libraries being located aboard a ship.

According to various embodiments, the first magnetic tape is assigned with a status indicator indicating that data is stored on the first magnetic tape, the method further comprises: in response to the deletion of the data content, initiating a reconfiguration of the status indicator of the first magnetic tape to indicate that no data is stored on the first magnetic tape.

This may have the beneficial effect that the due to the reconfiguration the first magnetic tape may easily be identified as free storage capacity and used again to store new data.

According to various embodiments, the method further comprises:
  selecting the second magnetic tape to be mounted into the second magnetic tape drive from a set of magnetic tapes such that the selected second magnetic tape drive comprises no data stored there on using a status indicator for the selection assigned to the second magnetic tape indicating that no data is stored
  in response to the copying of the data content of the first magnetic tape onto the second magnetic tape, initiating a reconfiguration of the status indicator of the second magnetic tape to indicate that data is stored on the second magnetic tape.

This may have the beneficial effect that the second magnetic tape is dynamically selected. Furthermore, data losses due to overwriting of the content of the second magnetic tape by the copying process or after the process may be prevented.

According to various embodiments, the data content of the first magnetic tape is assigned with a data ID, the method further comprises: in response to the copying of the data content initiating an updating of a data ID inventory of the first and the second magnetic tape library by initiating a transfer of the data ID from the inventory of the first magnetic tape library to the inventory of the second magnetic tape library.

This may have the beneficial effect that the inventory of each magnetic tape library is kept up-to-date and the overall content is kept consistent, i.e., no data is redundant or lost.

According to various embodiments, the method further comprises: initiating the data transfer in response to receiving a data transfer request.

This may have the beneficial effect that the data transfer may be initiated upon necessity. In the meantime, the first and second magnetic tape drives may be used for standard tasks.

According to various embodiments, the method further comprising: receiving the data transfer request from a first computer system connected to a magnetic tape drive of the second magnetic tape library.

This may have the beneficial effect that the transfer procedure for transferring the data content from the first magnetic tape library is initiated by the first computer system, i.e., it from the sender side the data transfer. Thus, a transfer may be initiated, for example, if a predefined storage level of the first magnetic tape library is reached, in order to prevent a shortage of free storage capacity.

According to various embodiments, the method further comprising: receiving the data transfer request from a second computer system connected to a magnetic tape drive of the first magnetic tape library.

This may have the beneficial effect that the transfer procedure for transferring the data content from the second magnetic tape library is initiated by the second computer system, i.e., it from the receiver side the data transfer. Thus, a transfer may be initiated, for example, if a specific data content is required by the second magnetic tape library and/or the second computer system.

According to various embodiments, the method further comprises: automatically initiating the data transfer upon the mounting of the first magnetic tape into the first magnetic tape drive.

This may have the beneficial effect of providing a fast and efficient mechanism for transferring the content of a magnetic tape from one library to another.

According to various embodiments, the method further comprises: the mounting the first magnetic tape being automatically initiated upon completion of recording of the first magnetic tape by a third magnetic tape drive of the first magnetic tape library.

This may have the beneficial effect that the data content comprised by the first magnetic tape library is efficiently limited such that free storage space is continuously provided regardless of the amount of data acquired and stored to the first magnetic tape library.

According to various embodiments, the first magnetic tape drive further is configured to be operable in a second mode, in the second mode the first magnetic tape drive are operable for reading data from or writing data onto a magnetic tape mounted in the first magnetic tape drive without need of a network connection to the second magnetic tape drive, the method further comprises:
  initiating a switching of the mode of the first magnetic tape drive from the second mode to the data transfer mode, when initiating the network connection,
  initiating a switching of the mode of the first magnetic tape drive from the data transfer mode back to the second mode upon completion of the copying of the data content.

This may have the beneficial effect that the first magnetic tape drive may not only be operated in the transfer mode, but may also provide standard functionality of known magnetic tape drives in the second mode, i.e., reading and writing data from and on a magnetic tape mounted into the respective magnetic tape drive without transferring data to another magnetic tape drive via a drive-to-drive network connection. The second mode may further comprise that data written by a magnetic tape drive is compressed before writing by using the compression module and data read by a magnetic tape drive is decompressed upon reading by using the compression module.

According to various embodiments, the method further comprises:
  initiating a writing of data onto the first magnetic tape by the first magnetic tape drive operated in the second mode,
  the switching of the second mode to the data transfer mode being performed upon completion of the writing of data.

This may have the beneficial effect that the recorded data is directly transferred upon completion. Thus, the storage capacity required for storing data is kept at a minimum.

According to various embodiments, the method further comprises:
  upon the mounting of the first magnetic tape into the first magnetic tape drive initiating a queuing of data access commands for accessing data via the first magnetic tape drive,
  upon the unmounting of the first magnetic tape ending the respective blocking of data access commands.

This may have the beneficial effect that an unhindered copying is ensured, while other data access commands have to wait.

According to various embodiments, the method further comprises:
  upon the mounting of the first magnetic tape into the first magnetic tape drive initiating a blocking of data access commands for accessing data via the first magnetic tape drive received from a third computer system,
  upon the unmounting of the first magnetic tape ending the respective blocking of data access commands received from the third computer system.

This may have the beneficial effect that for a third computer system, e.g., a backup server, trying to access the first magnetic tape drive the respective magnetic tape may become temporarily inaccessible or even invisible for a third computer system during the copying. Thus, an interference of the third computer system, e.g., a backup server trying to access the respective magnetic tape drive for performing a backup, may be prevented.

According to various embodiments, the method further comprises:
  upon the mounting of the second magnetic tape into the second magnetic tape drive initiating a queuing of data access commands for accessing data via the second magnetic tape drive,
  upon the unmounting of the second magnetic tape ending the respective blocking of data access commands.

This may have the beneficial effect that an unhindered copying is ensured, while other data access commands have to wait.

According to various embodiments, the method further comprises:

upon the mounting of the second magnetic tape into the second magnetic tape drive initiating a blocking of data access commands for accessing data via the second magnetic tape drive received from a third computer system, upon the unmounting of the second magnetic tape ending the respective blocking of data access commands received from the third computer system.

This may have the beneficial effect that for a third computer system, e.g., a backup server, trying to access the second magnetic tape drive the respective magnetic tape drive may become temporarily inaccessible or even invisible for a third computer system during the copying. Thus, an interference of the third computer system, e.g., a backup server trying to access the respective magnetic tape drive for performing a backup, may be prevented.

According to various embodiments, the second magnetic tape drive further is configured to be operable in a second mode, in the second mode the second magnetic tape drive is operable for reading data from or writing data onto a magnetic tape mounted in the second magnetic tape drive without need of a network connection to the second magnetic tape drive, the method further comprises:

initiating a switching of the mode of the second magnetic tape drive from the second mode to the data transfer mode, when initiating the network connection, initiating a switching the mode of the second magnetic tape drive from the data transfer mode back to the second mode upon the completion of the copying of the data content.

This may have the beneficial effect that the second magnetic tape drive may not only be operated in the transfer mode, but may also provide standard functionality of known magnetic tape drives in the second mode, i.e., reading and writing data from and on a magnetic tape mounted into the respective magnetic tape drive without transferring data to another magnetic tape drive via a drive-to-drive network connection. The second mode may further comprise that data written by a magnetic tape drive is compressed before writing by using the compression module and data read by a magnetic tape drive is decompressed upon reading by using the compression module.

According to various embodiments, the method further comprises controlling the first magnetic tape drive to be operated permanently in the transfer mode.

This may have the beneficial effect that the first magnetic tape drive may be configured for data transfer only, i.e., reserved for data transfers. Thus, it is a data transfer may always be performed, if necessary.

According to various embodiments, the method further comprises controlling the second magnetic tape drive to be operated permanently in the transfer mode.

This may have the beneficial effect that the second magnetic tape drive may be configured for data transfer only, i.e., reserved for data transfers. Thus, it is a data transfer may always be performed, if necessary.

According to various embodiments, the first and the second magnetic tape library each comprise a mechanical pass-through connection for mechanically transporting magnetic tapes from one magnetic tape library to another, the method further comprises:

checking whether the first and the second magnetic tape drive are connected by a common mechanical pass-through connection, initiating the network connection between the first and the second magnetic tape drive upon determining that the first and the second magnetic tape library are not connected by a common mechanical pass-through connection.

This may have the beneficial effect that data tapes are only transferred in an electronic way via the network connection between the first and the second magnetic tape library if necessary. Thus resources and therefore costs may be saved.

According to various embodiments, the first magnetic tape is comprised by a third magnetic tape library connected to the first magnetic tape library via the mechanical pass-through connection of the first magnetic tape library, initiating the mounting of the first magnetic tape further comprising: initiating a transfer of the first magnetic tape to the first magnetic library via the mechanical pass-through connection between first and the second magnetic tape library.

This may have the beneficial effect that the first magnetic tape library may be extended by further magnetic tape libraries, thus increasing the storage capacity of the respective magnetic tape library. Thereby, the mechanical pass-through mechanisms provided between the magnetic tape libraries may be efficiently used.

According to various embodiments, the transfer of the first magnetic tape to the first magnetic library may be initiated via the fastest mechanical pass-through connection between first and the second magnetic tape library This may have the beneficial effect that the transfer speed of the data comprised by the first magnetic tape from storage slot of the first magnetic tape library to the second magnetic tape in the second magnetic tape library may be optimized. For example the mechanical pass-through connection with the shortest distance between source location and target location of the first magnetic tape may be selected.

According to various embodiments, a fourth magnetic tape library is connected to the second magnetic tape library via the mechanical pass-through connection of the second magnetic tape library, the method further comprising: upon the rewinding of the second magnetic tape, initiating a transfer of the second magnetic tape to the fourth magnetic tape library via the respective mechanical pass-through connection.

This may have the beneficial effect that the second magnetic tape library may be extended by further magnetic tape libraries, thus increasing the storage capacity of the respective magnetic tape library. Thereby, the mechanical pass-through mechanisms provided between the magnetic tape libraries may be efficiently used.

The present data transfer method may be part of the following data processing procedure: Data capturing or generating data within a first data center, data transferring to a second data center, data processing in the second data center, e.g., data analysis. The amount of captured data may be large requiring the data to be stored on multiple magnetic tape cartridges within a magnetic tape library.

When the data capturing for a given magnetic tape cartridge is completed, the magnetic tape cartridge may be exported, for example, through an import/export station.

The present invention may provide an electronic transfer channel based on two connected magnetic tape drives, which are configured in both libraries as import/export elements. An export of a first magnetic tape cartridge via the respective electronic transfer channel may be implemented by electronically copying the data content of the respective magnetic tape from the first magnetic tape library to the second magnetic tape library. This copying may be done directly by firmware of the two magnetic tape drives providing for a data transfer management component without interaction from any host computer system. Upon completion of the copying, the target magnetic tape may show up as a newly inserted media inside the second magnetic tape library. Further, the source magnetic tape cartridge may appear as an empty cartridge within the first magnetic tape library, which may be used again for additional data capturing.

Once a new magnetic tape has shown up in the second magnetic tape library, the data processing of the data contained by the respective magnetic tape may be started.

Beneficial effects of present invention may be illustrated by the following example: In offshore research large amounts of data, e.g., seismic data in search for new oil resources, may be generated aboard a ship cruising through the ocean. This data may be stored on magnetic tapes comprised by cartridges in a magnetic tape library aboard the ship. These magnetic tape cartridges may have to be transferred to another magnetic tape library, e.g., located in a data center onshore, for analysis and long term storage.

Currently, the respective magnetic tape cartridges have to be hand carried from the ship to the data center. Thus, the ship may have to dock in a harbor. The magnetic tape cartridges with the seismic data have to be exported via the import/export station of the magnetic tape library. A truck may pick up those magnetic tape cartridges and transport them to the data center. New cartridges need to be inserted into the magnetic tape library to compensate for the removed magnetic tape cartridges. The complete process may take several hours. Furthermore, for the manual transportation process there is a risk of damaging or loosing magnetic tape cartridges due to a dropping or shocks.

This approach is time consuming and may suffer from the disadvantages indicated above for the mechanical transfer on magnetic tape cartridges between magnetic tape libraries.

According to various embodiments, electronically transporting, e.g., 2.5 TB of uncompressed data of an LTO6 tape cartridge may be performed within 2.5 hours. Referring to the example use case above, the present method allows continuous offshore data capturing, fast automatic data transfer and remote data processing and analysis.

According to various embodiments, the method may, for example, comprise: A pair of data ports provided by two magnetic tape drives of different magnetic tape libraries may be connected to each other via a network. The data ports may, for example, be connected with each other either directly via a wire or via a network switch. The network may be, for example, a storage area network (SAN). This allows for a bidirectional bridge connection between the two magnetic tape drives. With this bidirectional bridge connection, the two magnetic tape drives may provide a logical duct. If a first magnetic tape cartridge is loaded into one of the two magnetic tape drives at one end of the duct, a logical copy of this magnetic tape cartridge may automatically appear at the other end of the duct. This allows the remote data processing of the data contained by a first magnetic tape cartridge of a first magnetic tape library in a second magnetic tape library without a manual transport of the respective magnetic tape cartridge.

According to various embodiments, a respective duct may be provided by dedicated magnetic tape drives which may coexist with known physical pass-through devices. This may have the beneficial effect of allowing a transportation of magnetic tape cartridge data between multiple magnetic tape libraries located at different global locations via network.

Upon initiating by a data transfer management component a moving of a first magnetic tape cartridge into the import/export address element range configured for the data transfer operation in the first magnetic tape library, the process may be started automatically. The data transfer management component may manage the second magnetic tape library to move an empty magnetic tape cartridge into the target magnetic tape drive of the second magnetic tape library. Once a second magnetic tape cartridge is loaded in the target magnetic tape drive, the content of the source magnetic tape cartridge in the first magnetic tape library is copied to the second magnetic tape library without any host computer system involved in the data transfer path. Therefore, a high performance storage connection between the two magnetic tape drives may be provided. Upon completion of the copying process, the target magnetic tape cartridge may be inserted into the inventory of the second magnetic tape library indicating a change of media in a database comprising the respective inventory.

In a parallel process, the data stored on the source magnetic tape cartridge, which has been copied to the target magnetic tape cartridge, may be deleted and the first magnetic tape library may receive a media change notification. The media change notification may trigger host computer system applications of both magnetic tape libraries to manage the library content provided by the source and target magnetic tape cartridge, respectively.

For the present method, two or more magnetic tape drives of two or more magnetic tape libraries dedicated for electronic data transfer may be required to be available within a storage network.

For the present approach, the current SCSI element location address for a selected tape drive may be reduced to a necessary minimum amount of addresses to operate with the mechanical pass-through. The freed up SCSI element location addresses may be replaced with an associated import/export element (IEE) address that is reserved for a tape drive electronic data transfer. This may allow the magnetic tape library to reserve one or more magnetic tape drives for data transfer with priority over interface functionality as an HD-P import/export element with a backup application.

According to various embodiments, an upper address range from 704 to 768 may be the new associated import/export element address range reserved for the magnetic tape drive electronic data transfer.

According to various embodiments, a configuration option to select a magnetic tape drive as an electronic data transfer device may be added at the configuration menu of a magnetic tape library. Thereby, the respective magnetic tape drives first priority may be changed to operate in a dedicated transfer mode being invisible for backup application operation.

According to various embodiments, the data transfer management component may detect magnetic tape drives configured as electronic data transfer devices of a plurality of magnetic tape libraries within a storage network. The data transfer management component may provide network connection information and a routing matrix for establish the connection between a source magnetic tape library and a target magnetic tape library.

When a magnetic tape cartridge is loaded into a magnetic tape drive which is configured as an electronic data transfer device, e.g., IEE address 704, all the data comprised by the magnetic tape of the respective cartridge may be transferred to a target magnetic tape drive including data relevant for the cartridge memory and data of possible partitions.

The process may start automatically. If the data transfer management component detects a cartridge present in the source IEE electronic data transfer device provided by the first magnetic tape drive, it automatically establishes a network connection to a dedicated magnetic tape drive of the target magnetic tape library configured as an electronic data transfer device. The data transfer management component may initiate a mounting of a new empty magnetic tape cartridge into the target magnetic tape drive configured as an electronic data transfer device of the second magnetic tape library. The data transfer management component may reconfigure the network switch connected to the target magnetic tape library IEE element address in order to connect to the target magnetic drive. Then, the data transfer management component may initiate the transfer of the data content of the source magnetic tape to the target magnetic tape without any additional intervention of a further computer system.

According to various embodiments, modifying a dedicated data transfer byte to the copy command allows transferring all data of a dedicated magnetic tape cartridge to another tape library via a storage network, triggering a barcode change at the backup application level to maintain the identity of the data moved to the second tape library and automatically deleting the source magnetic tape to free up the respective storage space after the data transfer from the source magnetic tape library has been completed.

Figure 1:
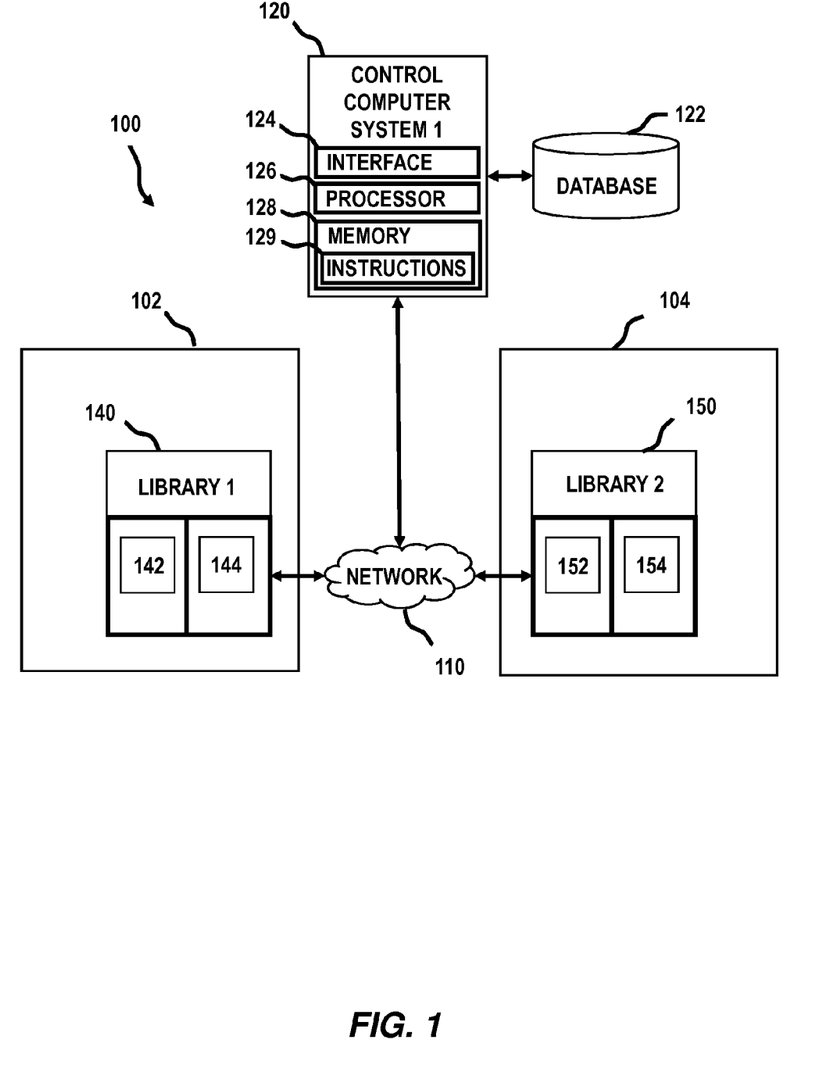
FIG. 1 depicts a first schematic diagram illustrating of two exemplary magnetic tape libraries connected via a network, according to an embodiment of the present invention.

FIG. 1 depicts a first schematic block diagram of a first magnetic tape library 140 comprising a first magnetic tape drive 142 which is connected to a second magnetic tape drive 152 of a second magnetic tape library 150 via a network 110. The data transfer between the two libraries 140, 150 is controlled by a data transfer management computer system 120 (also referred to herein as the control computer system 120) connected both libraries 140, 150, e.g., via the network 110. The data transfer management computer system 120 may comprise an interface 124 for controlling the magnetic tape libraries 140, 150 via the network 110. The data transfer management computer system 120 may further comprise a processor 126 and a memory 128 comprising machine-executable instructions 129. Execution of the machine-executable instructions 129 by the processor 126 may cause the processor 126 to control the present method for transferring data. The data transfer management computer system 120 may further have access to a database 122 comprising an inventory of the data content of both libraries 140, 150. The data transfer may be controlled by the data transfer management computer system 120 upon request, automatically, and/or upon querying the database 122.

The first magnetic tape library 140 may be, for example, located aboard a ship 102, while the second magnetic tape library 150 may be located in a data center onshore 104. Acquired data stored in magnetic tapes 144 in the first magnetic tape library 140 may be transferred instantaneously, upon reaching a predefined threshold or upon a data transfer request via the network 110 to the second magnetic tape library 150. By electronically copying the data and deleting the data after transfer from the magnetic tape 144 in the first magnetic tape library 140, there is no need to substitute any magnetic tapes in order to maintain the storage capacity of the first magnetic tape library 140 even though magnetic tapes are virtually transferred to the second magnetic tape library 150.

High density pass-through (HD-P) import/export elements (IEE) may be used as mechanical pass-through station addresses, the IEE range of a magnetic tape library may comprise a plurality of IEE addresses or mechanical pass-through station addresses, e.g., 256.

Magnetic tape drives 142, 152 may comprise a single Fibre Channel port, two Fibre Channel ports, Ethernet ports, one or two SAS (Serial Attached Small Computer System Interface (SCSI)) network ports and/or other interfaces for transferring data.

A data transfer management component may comprise one or more data transfer management computer systems 120. For example, there may be more than one data transfer management computer system 120 and the function that data transfer management computer system 120 provides may be distributed among the more than one data transfer management computer system 120. Alternatively, a data transfer management component may comprise an application, program, thread, process, module, function, or other software structure running on magnetic tape library 140 or 150, or a combination thereof. In this example, there may not be a data transfer management computer system 120 and the function that it provides may be provided by magnetic tape library 140 or 150, or a combination thereof.

For example, magnetic tape library 140 and magnetic tape library 150 may be seen to the host application as one large library which comprises magnetic tape drive 142 and magnetic tape drive 152. When the host application requests to move a magnetic tape from magnetic tape library 140 to magnetic tape drive 152 in library 150, there is no physical path to complete the move operation. The magnetic tape and the magnetic tape drive are in two different libraries with no physical pass-thru mechanism. Data transfer management computer system 120 instructs magnetic tape library 140 to move the cartridge to magnetic tape drive 142 and then creates a data transfer connection between magnetic tape drive 142 and magnetic tape drive 152. This connection allows the host application to read/write data from/to the magnetic tape as though that tape were mounted in magnetic tape drive 152. Creating or initiating the data transfer connection may comprise information about the network path or address of the drive. For example, a data transfer management component may instruct magnetic tape drive 142 to establish a data transfer connection with magnetic tape drive 152 and may provide the address or network path on which magnetic tape drive 152 can be found. Alternatively, a data transfer management component may instruct magnetic tape drive 152 to establish a data transfer connection with magnetic tape drive 142 and may provide the address or network path on which magnetic tape drive 142 can be found. Still further, a data transfer management component may instruct magnetic tape drive 142 to establish a data transfer connection with magnetic tape drive 152 and it may instruct magnetic tape drive 152 to establish a data transfer connection with magnetic tape drive 142. In one embodiment, control computer system 120 provides the network path between the magnetic tape drives. In another embodiment, requesting computer system 130 provides the network path between the magnetic tape drives. In another embodiment, magnetic tape library 140 and/or magnetic tape library 150 provides the network path between the magnetic tape drives. In another embodiment, the drives are connected via one or more network links without any involvement from control computer system 120, requesting computer system 130, magnetic tape library 140, or magnetic tape library 150. In another embodiment, the network path is not provided by any of the above.

In order to prevent other computer system from performing a cartridge movement to magnetic tape drive 142 while it is performing a data transfer connection with magnetic tape drive 152, control computer system 120, magnetic tape library 140, magnetic tape library 150 and/or magnetic tape drive 142 may queue or delay any commands that require access to magnetic tape drive 142. Another method to prevent resource conflict of magnetic tape drive 142 is for control computer system 120, magnetic tape library 140, magnetic tape library 150, and/or magnetic tape drive 142 to show the drive as busy or inaccessible while it has a data transfer connection established. Thus, the magnetic tape drive 142 is temporary unavailable other tasks like backup activities initiated by other computer systems like backup computer systems. After the requested file has been transferred to a target magnetic tape drive 152, the original address of the magnetic tape drive 142 is automatically restored. Thereby, the original configuration of the magnetic tape drive may restored such that computer systems assigned to this magnetic tape drive 142 may continue to use the respective magnetic tape drive 142 direct read/write processes, like backup tasks, without data transferred to or from other magnetic tape drives 152 of other magnetic tape libraries 150. Thus, the respective magnetic tape drive 142 becomes available for other computer systems.

Figure 2:
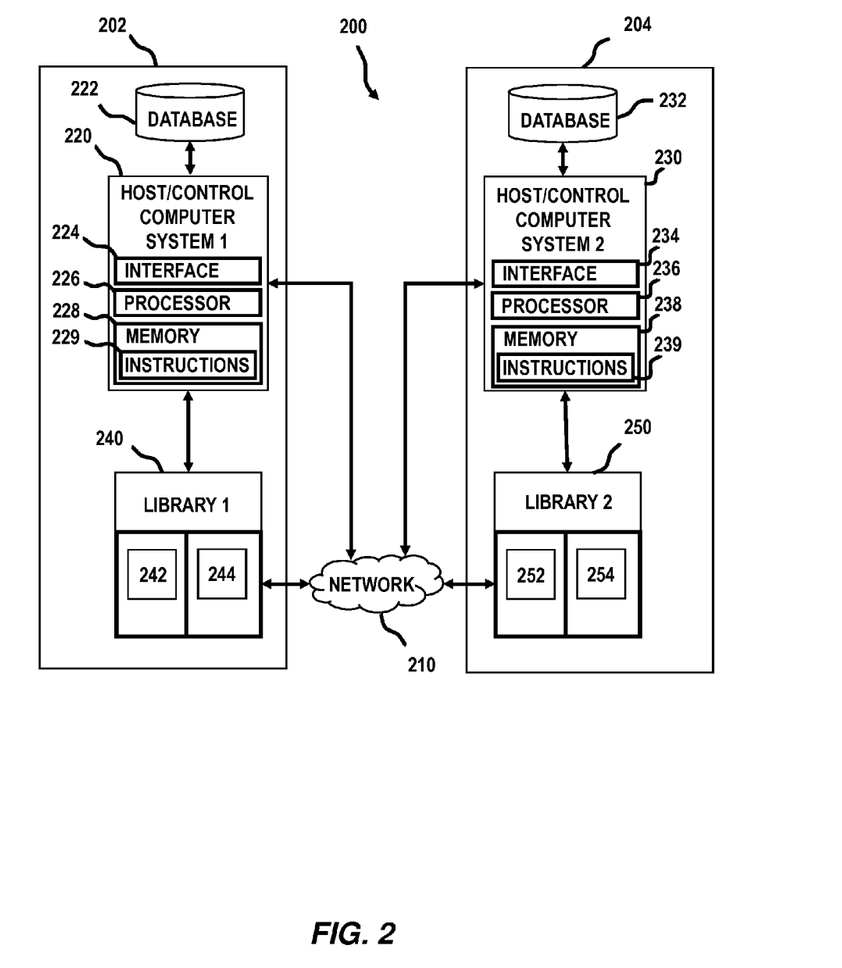
FIG. 2 depicts a second schematic diagram illustrating of two exemplary magnetic tape libraries connected via a network, according to an embodiment of the present invention.

FIG. 2 depicts a second schematic block diagram of a first magnetic tape library 240 comprising a first magnetic tape drive 242 which is connected to a second magnetic tape drive 252 of a second magnetic tape library 250 via a network 210. The first magnetic tape library 240 may, for example, again be located aboard a ship 202, while the second magnetic tape library 250 may be located in a data center onshore 204. The arrangement corresponds to the one depicted in FIG. 1. However, not a data transfer management computer system is provided, but each library 240, 250 is connected with a host computer system 220, 230. Each of this two host computer systems 240, 250 may be configured as a data transfer management computer system controlling the data transfer between the two magnetic tape libraries 140, 150.

Each host computer system 220, 230 may comprise an interface 224, 234 for controlling the magnetic tape libraries 140, 150 via the network 110. Each host computer system 220, 230 may further comprise a processor 226, 236 and a memory 228, 238 comprising machine-executable instructions 229, 239. Execution of the machine-executable instructions 229, 239 by the processor 226, 236 may cause the processor 226, 236 to control the present method for transferring data. Each host computer system 220, 230 may further have access to a database 222, 232 comprising an inventory of the data content of one or more of the libraries 140, 150. The data transfer may be controlled by each host computer system 220, 230 upon request, automatically, and/or upon querying the respective database 222, 232.

Figure 3:
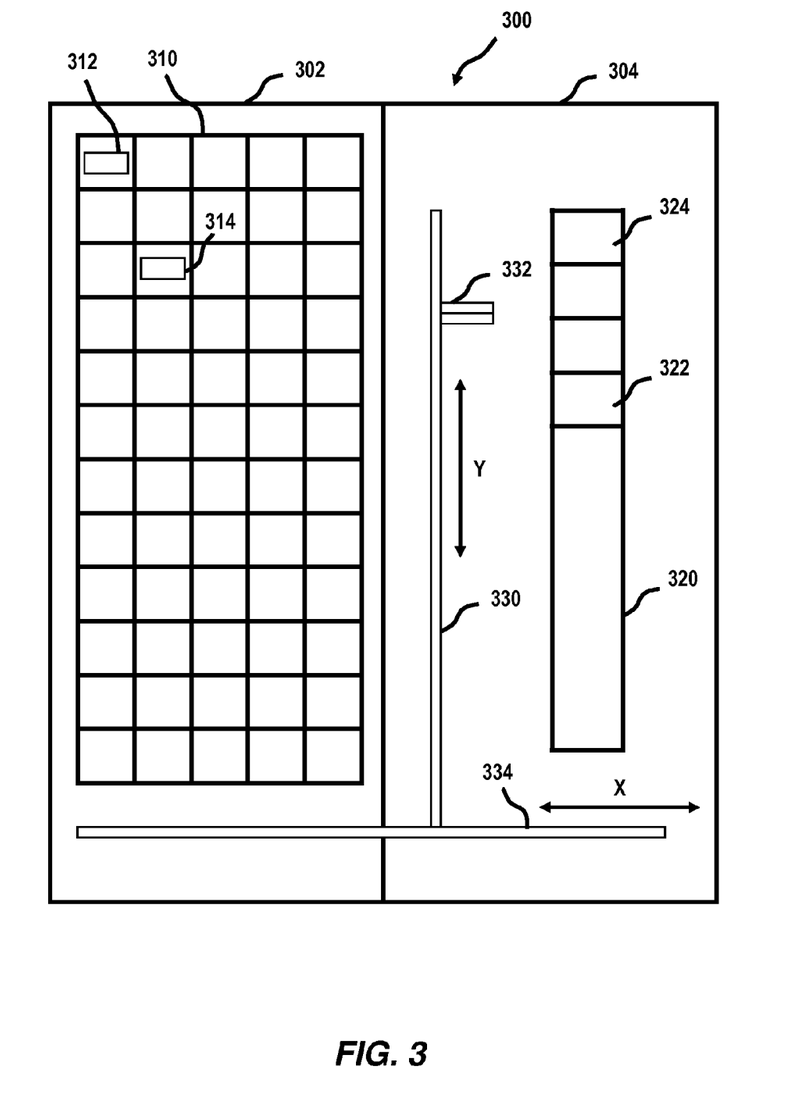
FIG. 3 depicts a schematic diagram illustrating an exemplary magnetic tape library, according to an embodiment of the present invention.

FIG. 3 depicts a schematic diagram of an exemplary dual frame magnetic tape library 300 with a first frame 302 and a second frame 304. The first frame comprises a plurality of magnetic tape cells 310, i.e., storage slots, in which magnetic tape cartridges 312, 314 are stored. The second frame 304 comprises a plurality of drive slots 320 with magnetic tape drives 322, 324. The plurality of magnetic tape drives 322, 324 comprises at least one magnetic tape drive 324 which is connectable via a network connection to a magnetic tape drive of another magnetic tape library. In order to transport the magnetic tape cartridges 312, 314 from the tape cells 310 to the magnetic drive slots 320 and back, an xy-accessor 330 is provided with a magnetic tape cartridge picker 332. The magnetic tape cartridge picker 332 is movable along the longitudinal axis of the xy-accessor in y-direction. Furthermore the xy-accessor is movable in x-direction along the longitudinal axis of an x-rail 334. Thus the xy-accessor 330 may be moved from the x-rail 334 to the tape cells 310. The cartridge picker 332 may be moved along the y-direction to a magnetic tape drive 324 comprising requested data. The respective magnetic tape 314 is picked by the cartridge picker 332 and transported to the magnetic tape drive 324 by the xy-accessor 330.

Figure 4:
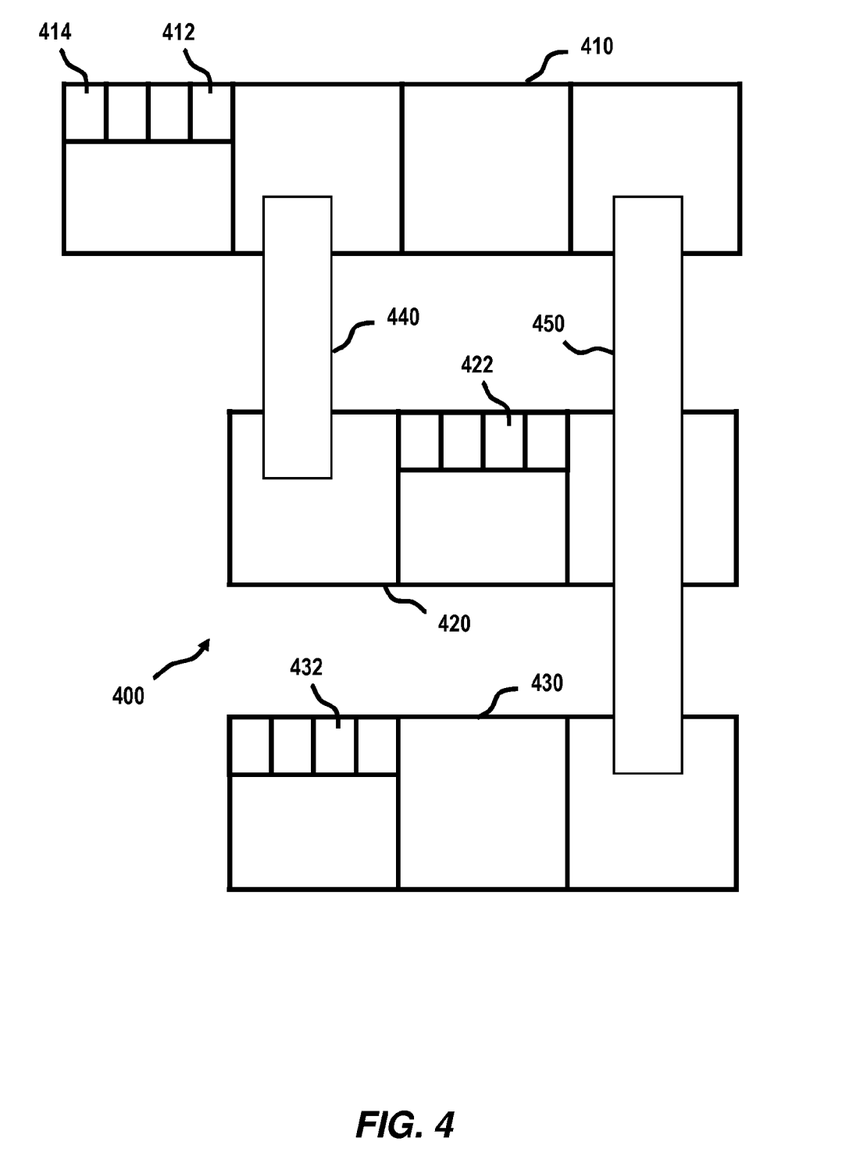
FIG. 4 depicts a schematic diagram illustrating an exemplary set of magnetic tape libraries connected via a mechanical pass-through mechanism, according to an embodiment of the present invention.

FIG. 4 depicts a schematic block diagram of a set of magnetic tape libraries 400. The set of magnetic tape libraries 400 comprises three multi-frame magnetic tape libraries 410, 420, 430 connected via mechanical magnetic tape cartridge pass-through devices 440, 450. Via the mechanical pass-through device 440 magnetic tape cartridges may be transported from the first magnetic tape library 410 to the second magnetic tape library 420 and vice versa by automated robotic devices. Via the mechanical pass-through device 450 magnetic tape cartridges may be transported between all magnetic tape libraries 410, 420, 430. Each of the three libraries 410, 420, 430 comprises a set of magnetic tape drives 412, 422, 432. In the example of FIG. 4, only the first magnetic tape library 410 comprises a magnetic tape drive 414 connectable via a network with a magnetic tape drive of another magnetic tape library (not depicted). In order to transfer data via a network connection provided by the first magnetic tape drive 414, a magnetic tape comprising the data to be transferred which is stored in the first magnetic tape library 410 may be mounted into the first magnetic tape drive 414. In case a cartridge is requested to be mounted to magnetic tape drive 312 in magnetic tape library 310, and that cartridge is stored either in the second magnetic tape library 420 or the third magnetic tape library 430, both of which do not comprise a magnetic tape drive connectable via the network, the respective magnetic tape is mechanically transported from the third or second magnetic tape library 430, 420 via the first or second pass-through device 440, 450 to the first magnetic tape library 410 and mounted into the first magnetic tape drive 412.

Figure 5:
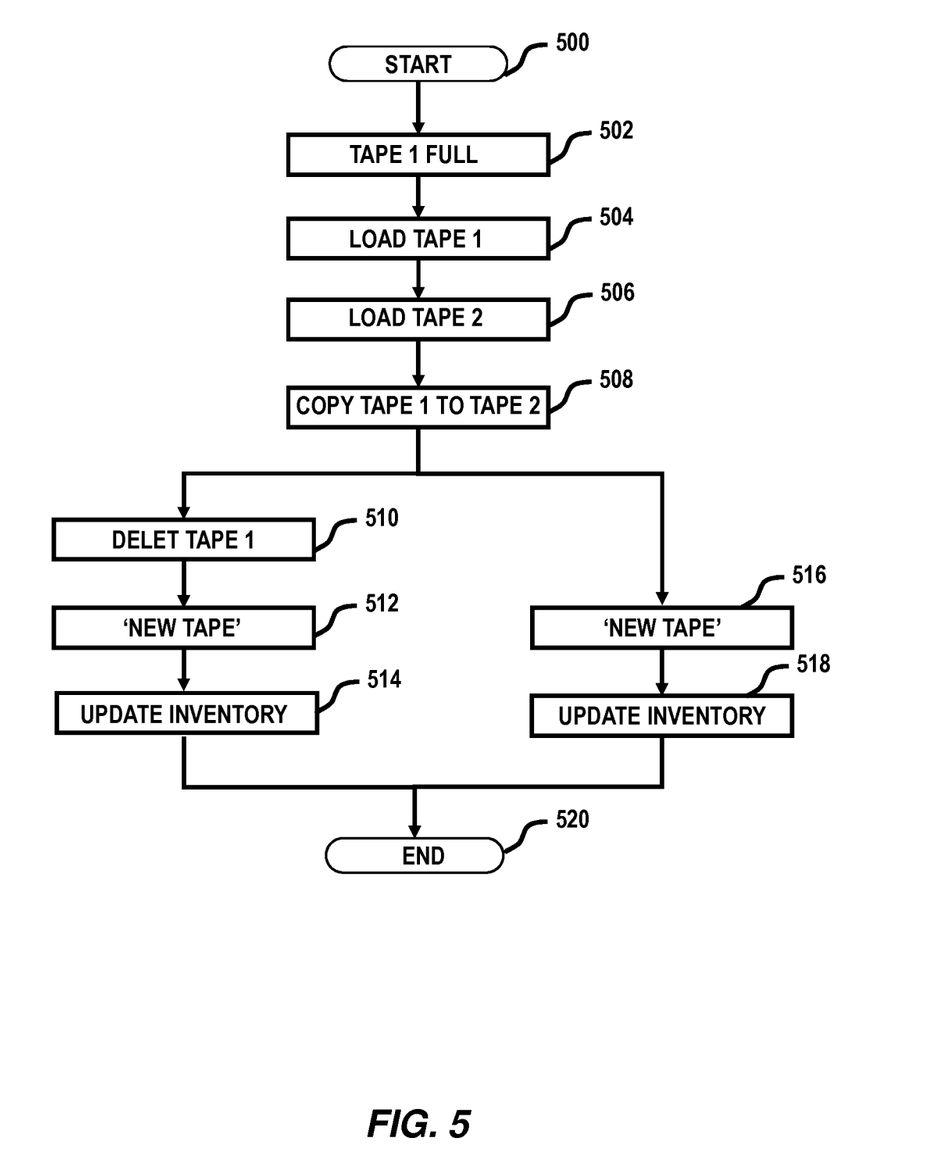
FIG. 5 depicts a schematic flow diagram of an exemplary first method for transferring the data content of a first magnetic tape of a first magnetic tape library to a second magnetic tape library, according to an embodiment of the present invention.

FIG. 5 depicts a first schematic block diagram of an exemplary method for transferring the full content of a magnetic tape from a first magnetic tape library to a second magnetic tape library. The data transfer is controlled by a data transfer management computer system controlling the host computer system of each library. Alternatively, the data transfer may be controlled by the data transfer management computer system directly controlling the both libraries or by one of the host computer systems acting as the data transfer management computer system. In block 500 the method starts. In case it is determined in block 502 that a magnetic tape to which required data is written has reached its storage limit, i.e., the magnetic tape is full, the cartridge comprising the respective magnetic tape is moved to the first magnetic tape drive in block 504. The first magnetic tape drive is connected with a second magnetic tape drive via a network connection. In block 506 it is requested via the network connection that the second magnetic tape drive loads an empty magnetic tape. In block 508 the data content of the first magnetic tape is copied via the network connection between the first magnetic tape drive and the second magnetic tape drive onto the empty magnetic tape located in the second magnetic tape drive. In block 510 the data content of the first magnetic tape which has been copied to the second magnetic tape is deleted. In block 512 a signal is sent to the host computer system controlling the first magnetic tape library indicating that a new empty magnetic tape is available. In block 514 the inventory of the first magnetic tape library is updated by the host computer system accordingly. In block 516 a signal is sent to the second host computer system controlling the second magnetic tape library indicating that a new magnetic tape comprising data has been inserted. In block 518 the inventory of the second magnetic tape library is updated accordingly by the second host computer system. Block 510 to block 514 may be performed parallel to the blocks 516 and 518 or independently of the same. In block 520 the method ends.

Figure 6:
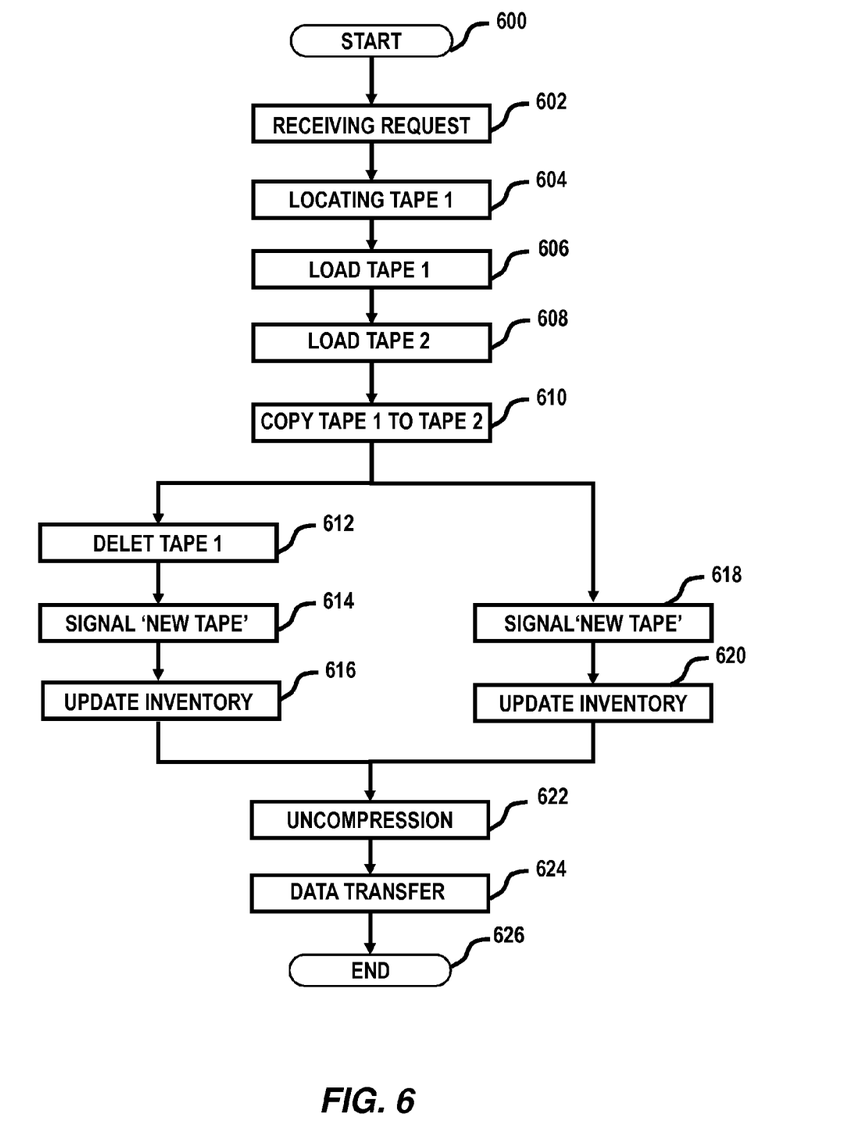
FIG. 6 depicts a schematic block diagram of an exemplary second method for transferring the data content of a first magnetic tape of a first magnetic tape library to a second magnetic tape library, according to an embodiment of the present invention.

FIG. 6 depicts a second schematic block diagram of a method for transferring the full data content of a magnetic tape from one magnetic tape library to another. The data transfer is initiated in response to a request for data comprised by the data content of a first magnetic tape in a first magnetic tape library. The request may be, for example, sent from a host computer system connected with a second magnetic tape library requiring the respective data. The request may be received by a data transfer management system controlling the data transfer. The method starts in block 600, in block 602 the data request is received by the data transfer management computer system. This may comprise a request to move a magnetic tape cartridge from one location to another location. Alternatively, this may comprise a request for particular Volser (tape volume serial number). Still further, this may comprise a request for a file, object, data structure, etc. In block 604 the magnetic tape comprising the requested data is determined. In block 606 the respective magnetic tape is loaded into the first magnetic tape drive. In block 608 the second magnetic tape drive of the second magnetic tape library is requested to load an empty magnetic tape. In block 610 the full content of the first magnetic tape is copied to the second magnetic tape via the network connection provided by the first magnetic tape drive and the second magnetic tape drive. Blocks 612 to 620 correspond analogously to blocks 510 to 518 of FIG. 6. In block 622 the requested data is decompressed by a compression module of the second magnetic tape drive and in block 624 transferred to the requesting computer system, e.g., the host computer system controlling the second magnetic tape library, in an uncompressed format. In block 626 the method ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention are described as comprising magnetic tape drives. However, any data storage drive may be used. A data storage drive is a device, module, circuit, etc. that can read and/or write data to/from a removable memory component or device. For example, and without limitation, data storage drives may comprise hard disk drives, tape drives, solid state drives (SSD), flash memory drives, optical disk drives, optical tape drives, etc.

Aspects of the present invention are described as comprising magnetic tape cartridges. However, any data storage cartridge may be used. A data storage cartridge is a moveable/removable storage medium that may or may not be housed in a casing, container, package, etc. For example, and without limitation, data storage cartridges may comprise magnetic tape, magnetic disk, hard disk drive, solid state disk, solid state disk drive, optical disk, optical tape, flash memory, MEMS (Micro-Electro-Mechanical Systems) based storage, RAM, DRAM, etc.

Aspects of the present invention are described as comprising magnetic tape libraries. However, any data storage library may be used. A data storage library is a device or system capable of moving data storage cartridges to or from a data storage drive.

Aspects of the present invention are described as comprising Ethernet and/or Fibre Channel links, connections, ports or networks. However, any network connection may be used. A network connection is a communication component, protocol, link medium, or topology for moving data from one device to another device. For example, and without limitation, a network connection may comprise Ethernet, Fibre Channel, FICON (Fibre Connection), USB (Universal Serial Bus), Wi-Fi, Wi-MAX, WLAN, Hiper-LAN, Hiper-MAN, cellular networks, satellite communications, Bluetooth, ZigBee, other wired links, other wireless radio links, other wireless optical links, wireless induction links, etc.

What is claimed is:

1. A computer-implemented method for transferring the data content of a first data storage cartridge of a first data storage library to a second data storage library, the first library comprising a first data storage drive, the second library comprising a second data storage drive, the first and second data storage drives being configured to be operable in a data transfer mode for transferring data storage cartridge data from the first data storage drive to the second data storage drive via a network connection, data transfer between the first and second data storage drives being controlled by a data transfer management component, the first and the second data storage libraries each comprising a mechanical pass-through connection that mechanically transports data storage cartridges from one data storage library to another data storage library, the method comprising:
   initiating, by a computer, a mounting of the first data storage cartridge into the first data storage drive;
   determining, by the computer, whether the first and the second data storage libraries are connected by a common mechanical pass-through connection;
   initiating, by the computer, a network connection between the first and second data storage drives upon determining that the first and the second data storage libraries are not connected by a common mechanical pass-through connection, both data storage drives being operated in the data transfer mode;
   initiating, by the computer, a mounting of a second data storage cartridge into the second data storage drive;
   initiating, by the computer, a copying of the data content of the first data storage cartridge onto the second data storage cartridge via the network connection; and
   initiating, by the computer, a deletion of the data of the first data storage cartridge.

2. The method of claim 1, wherein the data content is provided on the first data storage cartridge in a compressed data format, the method further comprising:
   controlling, by the computer, the first and second data storage drives to maintain the compressed data format when copying the data content.

3. The method of claim 1, wherein the network connection initiated between the first and second data storage drives is a wireless network connection.

4. The method of claim 1, wherein the first data storage cartridge is assigned a status indicator indicating that data is stored on the first data storage cartridge, the method further comprising:
   in response to the deletion of the data of the first data storage cartridge, initiating, by the computer, a reconfiguration of the status indicator of the first data storage cartridge to indicate that no data is stored on the first data storage cartridge.

5. The method of claim 1, the method further comprising:
   selecting, by the computer, the second data storage cartridge to be mounted into the second data storage drive from a set of data storage cartridges such that the selected second data storage cartridge comprises no data stored there on using a status indicator for the selection assigned to the second data storage cartridge indicating that no data is stored; and
   in response to the copying of the data content of the first data storage cartridge onto the second data storage cartridge, initiating, by the computer, a reconfiguration of the status indicator of the second data storage cartridge to indicate that data is stored on the second data storage cartridge.

6. The method of claim 1, wherein the data content of the first data storage cartridge is assigned a data ID, the method further comprising:
- in response to the copying of the data content of the first data storage cartridge onto the second data storage cartridge, initiating, by the computer, an updating of a data ID inventory of the first and the second data storage libraries by initiating a transfer of the data ID from the inventory of the first data storage library to the inventory of the second data storage library.

7. The method of claim 1, the method further comprising:
- initiating, by the computer, the data transfer in response to receiving a data transfer request.

8. The method of claim 1, the method further comprising:
- automatically initiating, by the computer, a data transfer from the first data storage drive to the second data storage drive upon the mounting of the first data storage cartridge into the first data storage drive.

9. The method of claim 1, wherein the first data storage drive is further configured to be operable in a second mode for reading data from, or writing data onto, a data storage cartridge mounted in the first data storage drive without need of a network connection to the second data storage drive, the method further comprising:
- initiating, by the computer, a switching of the mode of the first data storage drive from the second mode to the data transfer mode, when initiating the network connection; and
- initiating, by the computer, a switching of the mode of the first data storage drive from the data transfer mode back to the second mode upon completion of the copying of the data content.

10. The method of claim 9, the method further comprising:
- initiating, by the computer, a writing of data onto the first data storage cartridge by the first data storage drive operated in the second mode; and
- performing, by the computer, the switching of the second mode to the data transfer mode upon completion of the writing of data.

11. The method of claim 1, the method further comprising:
- upon the mounting of the first data storage cartridge into the first data storage drive, initiating, by the computer, a queuing of data access commands for accessing data via the first data storage drive; and
- upon the unmounting of the first data storage cartridge, ending, by the computer, the respective queuing of data access commands received.

12. The method of claim 1, wherein the second data storage drive is further configured to be operable in a second mode for reading data from or writing data onto a data storage cartridge mounted in the second data storage drive without need of a network connection to the second data storage drive, the method further comprising:
- initiating, by the computer, a switching of the mode of the second data storage drive from the second mode to the data transfer mode, when initiating the network connection; and
- initiating, by the computer, a switching the mode of the second data storage drive from the data transfer mode back to the second mode upon the completion of the copying of the data content.

13. The method of claim 1, the method further comprising controlling the first data storage drive to be operated permanently in the transfer mode.

14. The method of claim 1, the method further comprising controlling the second data storage drive to be operated permanently in the transfer mode.

15. A computer program product for transferring the data content of a first data storage cartridge of a first data storage library to a second data storage library, the first library comprising a first data storage drive, the second library comprising a second data storage drive, the first and second data storage drives being configured to be operable in a data transfer mode for transferring data storage cartridge data from the first data storage drive to the second data storage drive via a network connection, data transfer between the first and second data storage drive being controlled by a data transfer management component, the first and the second data storage libraries each comprising a mechanical pass-through connection that mechanically transports data storage cartridges from one data storage library to another data storage library, the computer program product comprising a computer readable storage medium having program instructions embodied therewith, the program instructions executable by a processor being adapted to cause the processor to control the data transfer management component to:
- initiate a mounting of the first data storage cartridge into the first data storage drive; determining whether the first and the second data storage libraries are connected by a common mechanical pass-through connection;
- initiate a network connection between the first and second data storage drives upon determining that the first and the second data storage libraries are not connected by a common mechanical pass-through connection, both data storage drives being operated in the data transfer mode;
- initiate a mounting of a second data storage cartridge into the second data storage drive; initiate a copying of the data content of the first data storage cartridge onto the second data storage cartridge via the network connection; and
- initiate a deletion of the data of the first data storage cartridge.

16. A data transfer management computer system for transferring the data content of a first data storage cartridge of a first data storage library to a second data storage library, the first library comprising a first data storage drive, the second library comprising a second data storage drive, the first and second data storage drives being configured to be operable in a data transfer mode for transferring data storage cartridge data from the first data storage drive to the second data storage drive via a network connection, data transfer between the first and second data storage drive being controlled by the data transfer management computer system, the first and the second data storage libraries each comprising a mechanical pass-through connection that mechanically transports data storage cartridges from one data storage library to another data storage library, the data transfer management computer system comprising a memory for storing machine executable instructions and a processor for executing the machine executable instructions, execution of the machine executable instructions by the processor causing the processor to execute a method comprising:
- initiating, by a computer, a mounting of the first data storage cartridge into the first data storage drive;
- determining, by the computer, whether the first and the second data storage libraries are connected by a common mechanical pass-through connection;
- initiating, by a computer, a network connection between the first and second data storage drives upon determining that the first and the second data storage libraries are not connected by a common mechanical pass-through connection, both data storage drives being operated in the data transfer mode;

initiate a mounting of a second data storage cartridge into the second data storage drive; initiate a copying of the data content of the first data storage cartridge onto the second data storage cartridge via the network connection; and initiate a deletion of the data of the first data storage cartridge.

* * * * *